US010997134B2

(12) United States Patent
Osesina et al.

(10) Patent No.: US 10,997,134 B2
(45) Date of Patent: May 4, 2021

(54) AUTOMATIC ENTITY RESOLUTION WITH RULES DETECTION AND GENERATION SYSTEM

(71) Applicant: AWARE, INC., Bedford, MA (US)

(72) Inventors: Olukayode Isaac Osesina, Waltham, MA (US); Taras P. Riopka, Concord, MA (US)

(73) Assignee: AWARE, INC., Bedford, MA (US)

( * ) Notice: Subject to any disclaimer, the term of this patent is extended or adjusted under 35 U.S.C. 154(b) by 756 days.

(21) Appl. No.: 15/566,983

(22) PCT Filed: Jun. 15, 2016

(86) PCT No.: PCT/US2016/037513
§ 371 (c)(1),
(2) Date: Oct. 16, 2017

(87) PCT Pub. No.: WO2016/205286
PCT Pub. Date: Dec. 22, 2016

(65) Prior Publication Data
US 2018/0137150 A1 May 17, 2018

Related U.S. Application Data

(60) Provisional application No. 62/181,266, filed on Jun. 18, 2015.

(51) Int. Cl.
*G06F 16/00* (2019.01)
*G06F 16/215* (2019.01)
(Continued)

(52) U.S. Cl.
CPC ........... *G06F 16/215* (2019.01); *G06N 5/048* (2013.01); *G06N 20/00* (2019.01)

(58) Field of Classification Search
CPC ....... G06F 16/215; G06N 20/00; G06N 5/048
(Continued)

(56) References Cited

U.S. PATENT DOCUMENTS 9,516,053 B1 * 12/2016 Muddu ............... H04L 63/1416
2003/0126102 A1 * 7/2003 Borthwick ............. G06N 20/00
706/21

(Continued)

FOREIGN PATENT DOCUMENTS

WO   WO 2011/085360        7/2011

OTHER PUBLICATIONS

Summons to Attend Oral Proceedings Pursuant to Rule 115(1) EPC for European Application No. 16812283.6, dated Mar. 20, 2020.
(Continued)

*Primary Examiner* — Thanh-Ha Dang
(74) *Attorney, Agent, or Firm* — Jason H. Vick; Sheridan Ross, PC

(57) ABSTRACT

Entity resolution (i.e., record linkage) involves the analysis/discovering of datasets that refer to the same real world entity. Analysis typically involves transformation and comparison of different fields of the dataset followed by the application of often domain/data specific logic for determining datasets that refer to the same real world entity (e.g., person). Consider, a bulk mailing of product catalogs to potential customers. Some individuals may have numerous public records that identify the individual differently. Illustratively, several records associated with Jane Doe at her current home address may exist: one record with her name listed as J. Doe, a second record as Jane H. Doe, a third record as Doe, Jane, and a fourth record as Jan Doe (a misspelling). Conceivably, the bulk mailing could unwittingly send multiple catalogs to Jane Doe at her current
(Continued)

address, one for each name variation. The entity resolution process described herein can overcome such problems.

24 Claims, 13 Drawing Sheets

(51) Int. Cl.
  *G06N 20/00* (2019.01)
  *G06N 5/04* (2006.01)
(58) Field of Classification Search
  USPC .......................................................... 707/692
  See application file for complete search history.

(56) References Cited

U.S. PATENT DOCUMENTS

| | | | |
|---|---|---|---|
| 2003/0154204 A1 | 8/2003 | Chen-Wright et al. | |
| 2004/0181526 A1 | 9/2004 | Burdick et al. | |
| 2005/0149522 A1* | 7/2005 | Cookson, Jr. | G06F 16/211 |
| 2010/0005057 A1* | 1/2010 | Bayliss | G06F 16/215 |
| | | | 707/E17.054 |
| 2011/0106807 A1 | 5/2011 | Srihari et al. | |
| 2011/0246501 A1* | 10/2011 | McMenamin | G06F 16/252 |
| | | | 707/769 |
| 2012/0221508 A1 | 8/2012 | Chaturvedi et al. | |
| 2013/0054598 A1* | 2/2013 | Caceres | G06F 16/215 |
| | | | 707/737 |
| 2013/0191329 A1* | 7/2013 | Dozier | G06F 16/215 |
| | | | 707/609 |
| 2013/0325881 A1 | 12/2013 | Deshpande et al. | |
| 2015/0161191 A1 | 6/2015 | Dozier et al. | |
| 2016/0364427 A1* | 12/2016 | Wedgeworth, III | G06F 16/27 |
| 2018/0253494 A1* | 9/2018 | Bhardwaj | G06F 7/026 |
| 2019/0095174 A1* | 3/2019 | Trudel | G06F 16/2465 |
| 2019/0361849 A1* | 11/2019 | Rogynskyy | G06F 16/285 |

OTHER PUBLICATIONS

Office Action for European Application No. 1681228.6, dated May 17, 2019.
Corrected International Search Report for International Application No. PCT/US2016/037513, dated Oct. 25, 2017.
Corrected Written Opinion for International Application No. PCT/US2016/037513, dated Oct. 25, 2017.
Invitation to Pay Additional Fees and, where Applicable, Protest Fee for International Application No. PCT/US2016/037513, dated Aug. 2, 2016.
International Search Report for International Application No. PCT/US2016/037513, dated Oct. 14, 2016.
Written Opinion for International Application No. PCT/US2016/037513, dated Oct. 14, 2016.
International Preliminary Report on Patentability for International Application No. PCT/US2016/037513, dated Dec. 28, 2017.
European Search Report for European Application No. 16812283.6, dated Mar. 9, 2018.

* cited by examiner

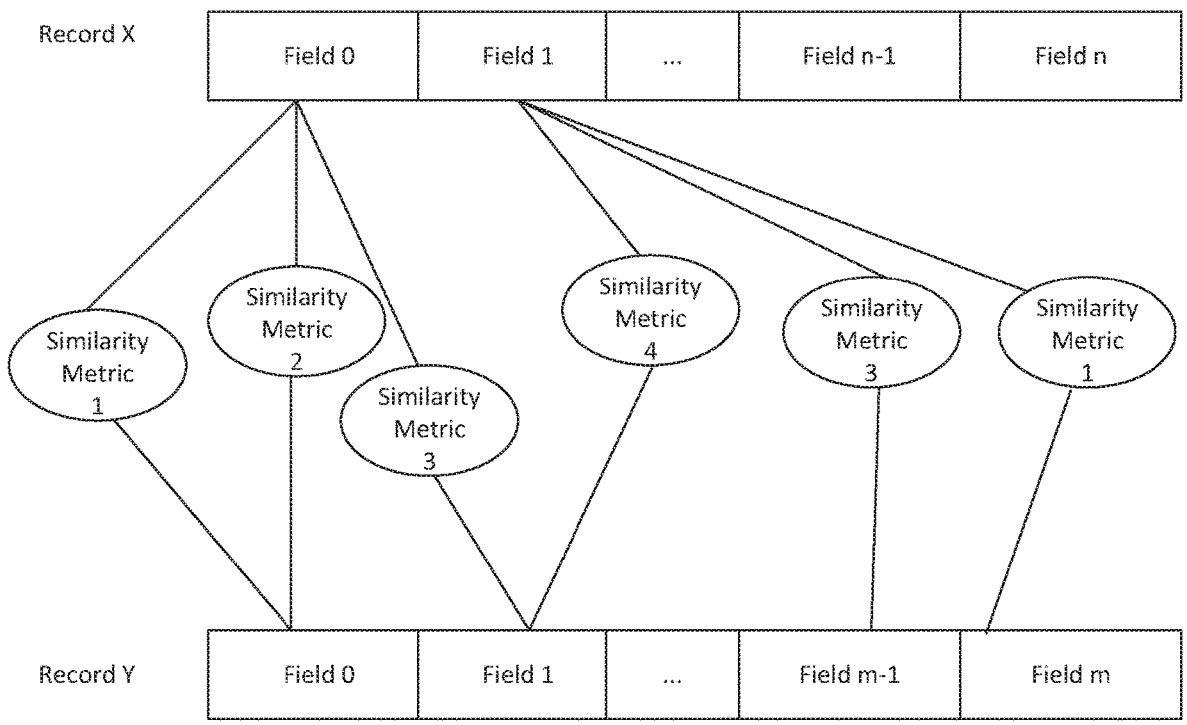
FIG. 2
Linkage Feature Value Generation
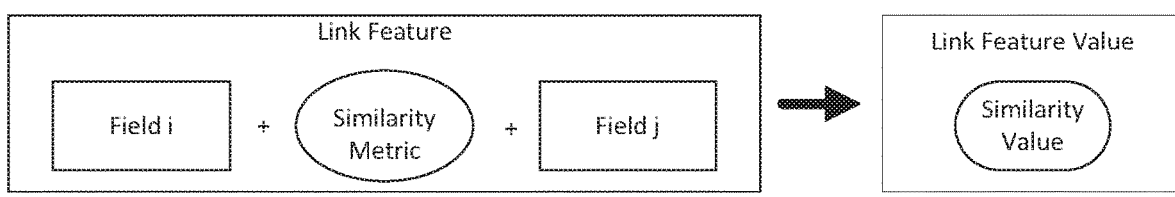
FIG. 3
Linkage Data Instance
| Link Feature 0 Link Feature Value | Link Feature 1 Link Feature Value | ... | Link Feature k-1 Link Feature Value | Link Feature k Link Feature Value |
FIG. 4

Training Classification Labeling

Entity 1

Entity 2

Same Entity Label

Different Entities Labelling

Training Instances

| Link Feature Set | Same Entity |

Created using records referring to the same entity

| Link Feature Set | Different Entity |

Created using records referring to the different entities

FIG. 6

Linkage Model Generation

Record   504

- Name
  - Last
  - First
  - Middle
- DOB
  - Date
- Address
  - Street
- Biometric Information
  - Data/Image
  - Fingerprint
  - Facial Image
- Soft Biometric information
  - Hair Color
  - Eye Color
  - Complexion
- Etc.

Fig. 12

AUTOMATIC ENTITY RESOLUTION WITH RULES DETECTION AND GENERATION SYSTEM

RELATED APPLICATION DATA

This application is a national stage application under 35 U.S.C. 371 of PCT Application No. PCT/US2016/037513, filed Jun. 15, 2016, which designated the United States, which PCT application claims the benefit of and priority under 35 U.S.C. § 119(e) to U.S. Patent Application No. 62/181,266, filed Jun. 18, 2015, entitled "AUTOMATIC ENTITY RESOLUTION RULES DETECTION AND GENERATION," each of which are incorporated herein by reference in their entirety

BACKGROUND

The process of entity resolution, also known as record linkage, involves the analysis and identification of datasets that refer to the same real world entity (e.g., person). The analysis typically involves transformation and comparison of different fields of the dataset followed by the application of often domain/data specific logic for determining datasets that refer to the same real world entity. Consider, for example, a bulk mailing of a product catalog to potential customers. Some individuals may have numerous public records that identify the individual differently. As a simple illustration, several records associated with Jane Doe at her current home address may exist: one record with her name listed as J. Doe, a second record as Jane H. Doe, a third record as Doe, Jane, and a fourth record as Jan Doe (a misspelling). Conceivably, the bulk mailing could unwittingly send multiple catalogs to Jane Doe at her current address, one for each name variation. The exemplary entity resolution process described herein can address such problems and inefficiencies.

BRIEF DESCRIPTION OF THE DRAWINGS

The exemplary embodiments of the technology will be described in detail, with reference to the following figures wherein:

FIG. 2 is a block diagram illustrating the definition of link features.

FIG. 3 is a block diagram illustrating generation of a link feature value from a link feature.

FIG. 4 is a block diagram of an embodiment of a linkage data instance comprised of link features and their associated link feature values.

FIG. 6 is a diagram illustrating training instances used to produce a linkage model: one training data instance has a link feature set and a label indicating that the records used to create the link feature set are associated with the same entity; a second training data instance has a link feature set and a label indicating that the records used to create the link feature set are associated with different entities.

FIG. 12 shows an exemplary format of a record.

DETAILED DESCRIPTION

An exemplary embodiment describes an efficient and improved method that addresses the two main challenges in entity resolution, namely:

Identification of the most efficient methods and tools for the comparison of records.

Determination of whether records based on the similarity performed in the above step refer to the same entity.

Exemplary embodiments are further directed toward an improvement in existing technology to:

automatically discover the most effective transformations and/or comparisons for data fields, automatically selecting best training samples that the describe the similarity complexities in a given dataset, and creating a model for determining when datasets refer to the same real world entity.

This model can then be used in real world scenarios to one or more of: increase efficiencies, reduce unnecessary waste, reduce costs, improve the functioning of entity resolution systems and eliminate or reduce duplicate records.

Figure 1:
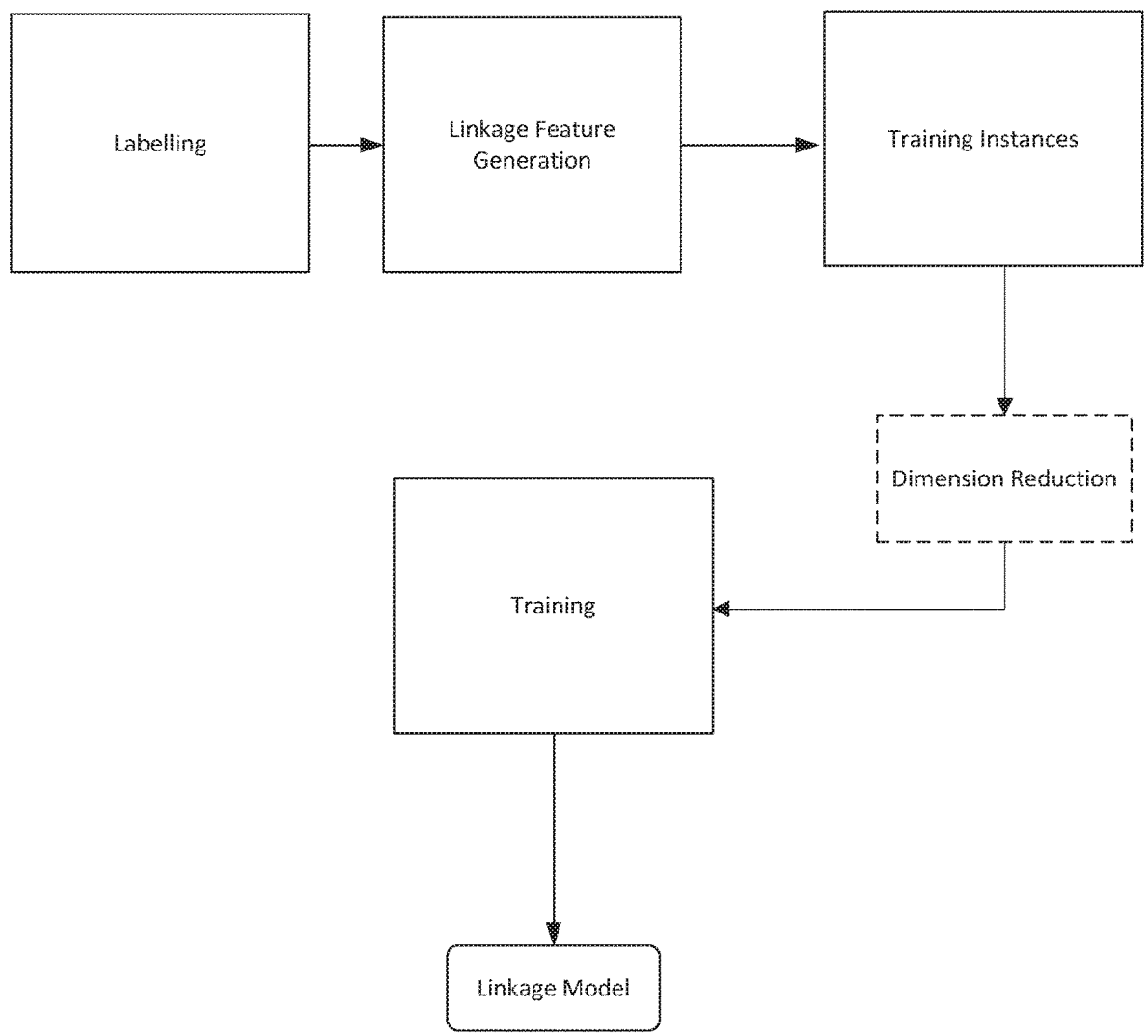
FIG. 1 shows an exemplary architectural level flow diagram of an embodiment of a process for generating a classifier model for determining when datasets refer to the same real world entity.

FIG. 1 illustrates an exemplary overview process for generating a classifier model for determining when datasets refer to the same real world entity is discussed in greater detail below. At a high level, the process includes labelling, linkage feature generation, a linkage training dataset, dimension reduction, training and an output linkage model.

Terminology:

Data reference: A set of data describing an object or an event/activity involving an object. These are typically in the form of records having a number of attributes/fields and values. A specific instance of a data reference is referred to as a record.

Entity: A group of records referring to a single real world entity (e.g., person/business/etc.). The determination of whether a record belongs to an entity is typically domain specific, often requiring subject-matter expertise and possibly involving several other records. For example, it may be determined that records with the information Mary Robbins of 40 Main Street, Bedford, Mass. and 10078 Broadway, Boston, Mass. refer to the same person via two other records (i) Marriage certificate (indicating name change) and (ii) change of address data.

Link Feature: A pair of record fields and a similarity metric used to measure a similarity characteristic of two record field values. (See FIG. 2 as an example.)

Link Feature Value: A value obtained by applying a similarity metric in a link feature to the field values of the two records of the link feature. (See FIG. 3 as an example of generating of a link feature value from a link feature.)

Linkage Data Instance: An array of link feature values, which sufficiently describes the similarity characteristics of all the fields in two records. (See FIG. 4 which illustrates an example of a link feature set comprised of link features and their associated link feature values.)

Link Label: A label associated with each linkage data instance indicating whether its originating records belong to the same entity (positive label) or not (negative label).

Training Instance: A linkage data instance and an associated link label. Positive and negative training instances are training instances associate with a positive link label and a negative link label, respectively.

Entity Resolution (ER): The process of determining if records and/or entities belong to the same real world individual.

Linkage Model: A system/logic for determining if two records refer to the same entity.

Some of the exemplary challenges in ER are addressed herein, namely:
  Identification of more efficient methods and tools for the comparison of records.
  Determination of whether records based on the similarity performed in the above step refer to the same entity.
  Automatic selection of pairs of records that best describe the similarity complexities in determining when records do and do not refer to the same entity.

On exemplary method of automatically identifying the efficient link features and generating an entity resolution linkage model can start with a set of entities or a description of the types of errors/variations among the field values of records referring to the same entity.

In accordance with one exemplary embodiment, a machine learning approach, called supervised learning, can be employed. Supervised machine learning infers a mathematical function from labeled training data.

Figure 5:
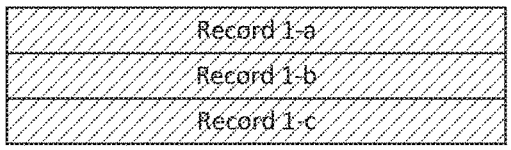
FIG. 5 is a diagram illustrating exemplary classification labels associated with records belonging to the same entities and with records belonging to different entities.
Figure 5:
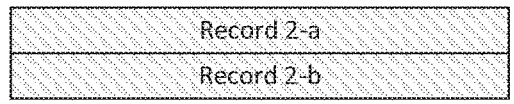
Figure 5:
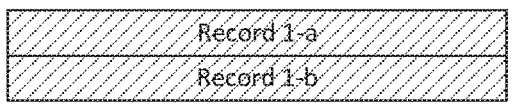
Figure 5:
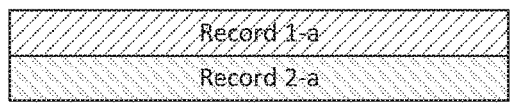
Figure 5:
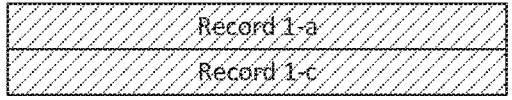
Figure 5:
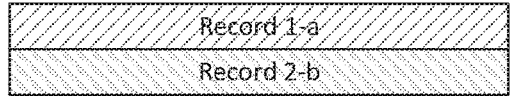
Figure 5:
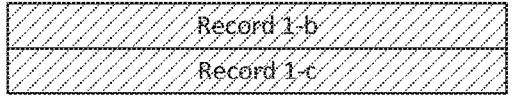
Figure 5:
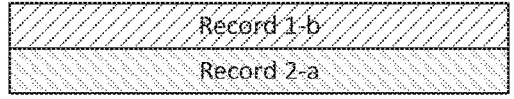
Figure 5:
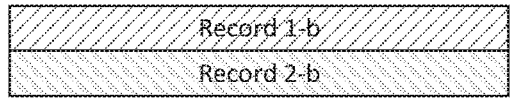
Figure 5:
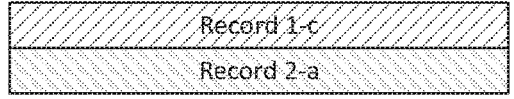
Figure 5:
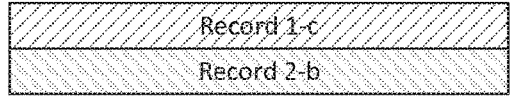

In the case of entity resolution, the training data should contain examples of when records belong to the same entity and otherwise. The training set can contain several instances of entities, from which linkage data instances described by a number of link features and a classification labels are automatically created. An example of classification labels can be seen in FIG. 5 with records belonging to the same entities and with records belonging to different entities. FIG. 6 is a diagram illustrating exemplary training instances used to produce a linkage model: one linkage data instance has a label indicating that the records used to create the link feature set are associated with the same entity; a second linkage data instance has a label indicating that the records used to create the link feature set are associated with different entities.

A link feature includes a pair of fields and a similarity metric for measuring the similarity/dissimilarity between the field values. The fields in a link feature may have the same or different names and semantic meanings. In general, a link feature describes a particular similarity characteristic in a dataset. A link feature value is the similarity/dissimilarity value obtained when the similarity metric in a link feature is applied to the values corresponding to each link feature fields.

An example of a link feature is a first name field, last name field, and phonetic similarity metric X; a link feature value for this link attribute can be obtained by measuring the similarity between the first name in record A and last name in record B using phonetic similarity metric X.

A linkage data instance is an array of link features and link feature values that describe the similarity between two records. The automatic and efficient link features identification method described herein addresses the major task of determining the similarity feature-space that best separates records that belong to the same entity from those that do not.

In other words, this refers to the most effective similarity/dissimilarity metrics for comparing fields, such as: the type of phonetic algorithm to apply to the name fields, transformation and edit-distance measures to apply to the date fields, such that the comparison results of records referring to the same entity and those referring to different entities are well separated.

Variation among field values of records referring to the same entity may arise as a result of the data acquisition, input, transformation processes, etc. Such information, which may be obtained along with the data or via separate analysis, can be used in determining the type of similarity metric to be used. For example, phonetic similarity can be expected to be very efficient when generating link features for data acquired through transcription. Also, a domain specific dictionary can be expected to be very effective for data acquired through transliteration. Given only the above variations/errors description, a dataset that exhibits the variations/errors can be simulated and used to generate linkage training dataset.

Automatic Link Feature Identification

Based on both the semantic meaning of the field and the characteristics of its data content, one exemplary method intelligently identifies a number of other fields that a particular field should be compared to, as well as the similarity/dissimilarity metric to be used.

Classification Labelling

Exemplary embodiments use two approaches to arrive at the labelling of linkage data instances, i.e., does a linkage data instance indicate records from the same or different entities.

Classification Labeling Deduction from Existing Entities

This exemplary approach relies on the availability of an entity dataset or knowledge of the variations/errors among records belonging to the same entity. The approach generates linkage features labelled "same entity" by using records from the same entity. In other words, the approach successively applies the similarity metrics in the link features to all the record pairs in an entity. Secondly, the approach generates a "different entities" label by comparing records in an entity to those in a different entity. The amount of training data generated for each label category is tunable.

This approach takes advantage of limited user input on records that are known to belong to the same entity to generate both positive and negative labels for the link features.

Classification Labelling Deduction from Expected Errors/Variation and Data Descriptions In this exemplary approach, user information on the types of errors or variation in records referring to the same entity as well as other data characteristics (such as name origins, address origin) are used to generate a simulated entity dataset that is then used to determine the link features as well as classification labelling. For example, data transcribed from telephone conversations may contain a significant amount of syntactic errors in the name fields. Also, the knowledge of the country of origin of the names will help in determining the types of entity data to simulate and the most effective comparators.

The generation of link features and their corresponding classification labels provide data that can be used for any supervised machine learning. This labelling scheme does not require that all the entities used be correct. That is, the labelling scheme may contain entities which (mistakenly) have records belonging to another entity or the labelling scheme may contain two or more entities that could be further merged to create one entity. Provided that these errors are not significant in proportion relative to the correct entities, they will mostly be identified in the training process as noise.

Automatic Probabilistic Linkage Model Generation

In ER, after the comparison of field values of records, a decision is made as to whether they belong to the same entity. The various methods used for making such decisions can be categorized as deterministic or probabilistic.

Deterministic methods involve the use of user defined thresholds and/rules for identifying cases where link features refer to the same entity. For example, a linkage rule may be defined as when the phonetic similarity of last name is greater than 0.9 and the syntactic similarity of the post code is greater than 0.8. (Although any value can be used.)

Probabilistic methods employ statistical methods to determine the probability that a linkage data instance indicate (or not) that records refer to the same entity.

This logic for determining whether a linkage data instance refers to the same entity will be referred to here as "linkage model". An exemplary probabilistic linkage model generated in accordance with one embodiment uses:
- an array of link features and their corresponding classification labels (training data set); and
- a sampling method of selecting an optimal challenging training dataset for machine learning algorithms which produces classifier that functions as a linkage model.

Figure 7:
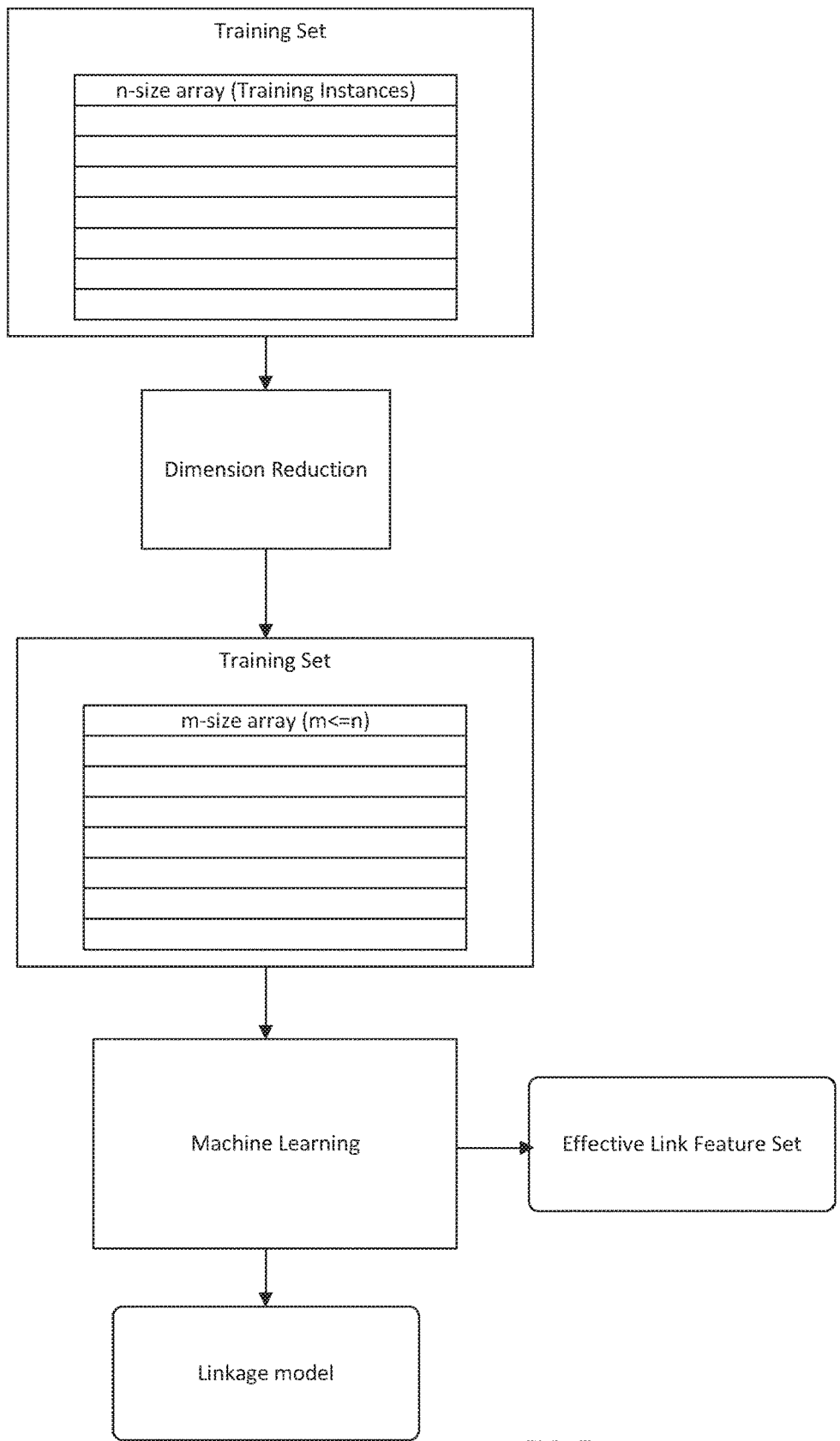
FIG. 7 is a flow diagram illustrating an embodiment of a process for using the training instances to produce the linkage model.

FIG. 7 illustrates an embodiment of a process for using the training instances to produce the linkage model including the dimension reduction, training instances, and machine learning discussed herein.

Entropy-Based Training Instances Sampling

One exemplary sampling method is aimed at selecting a set of record pairs that covers the most challenging similarity/dissimilarity complexities in the given dataset. Challenging similarity complexity occurs when a link feature value or a set of link feature values indicate both link labels (i.e., when records belong and do not to the same entity) in a manner such that the values for both link labels overlap. These ambiguous scenarios provide the richest statistical information from which a machine learning algorithm can deduce the conditions when records belong or do not belong to the same entity.

Given a number of entities, there is a limited number of training data instances with link labels indicating that the records belong to the same entity. However, the number of training instances with labels indicating that records do not belong to the same entity increases exponentially relative to the number of given entities.

For example, considering entities containing only 2 records; 10 and 180 positive and negative labels, respectively, can be created from 10 entities, 100 and 19800 positive and negative labels respectively can be created from 100 entities, and 1000 and almost 2 million negative examples can be created from 1000 entities. The count of negative labels can be calculated using the formula:

$$\text{Count of negative samples} = {}_nC_2 - n$$

Where n is the number of entities.

Figure 8:
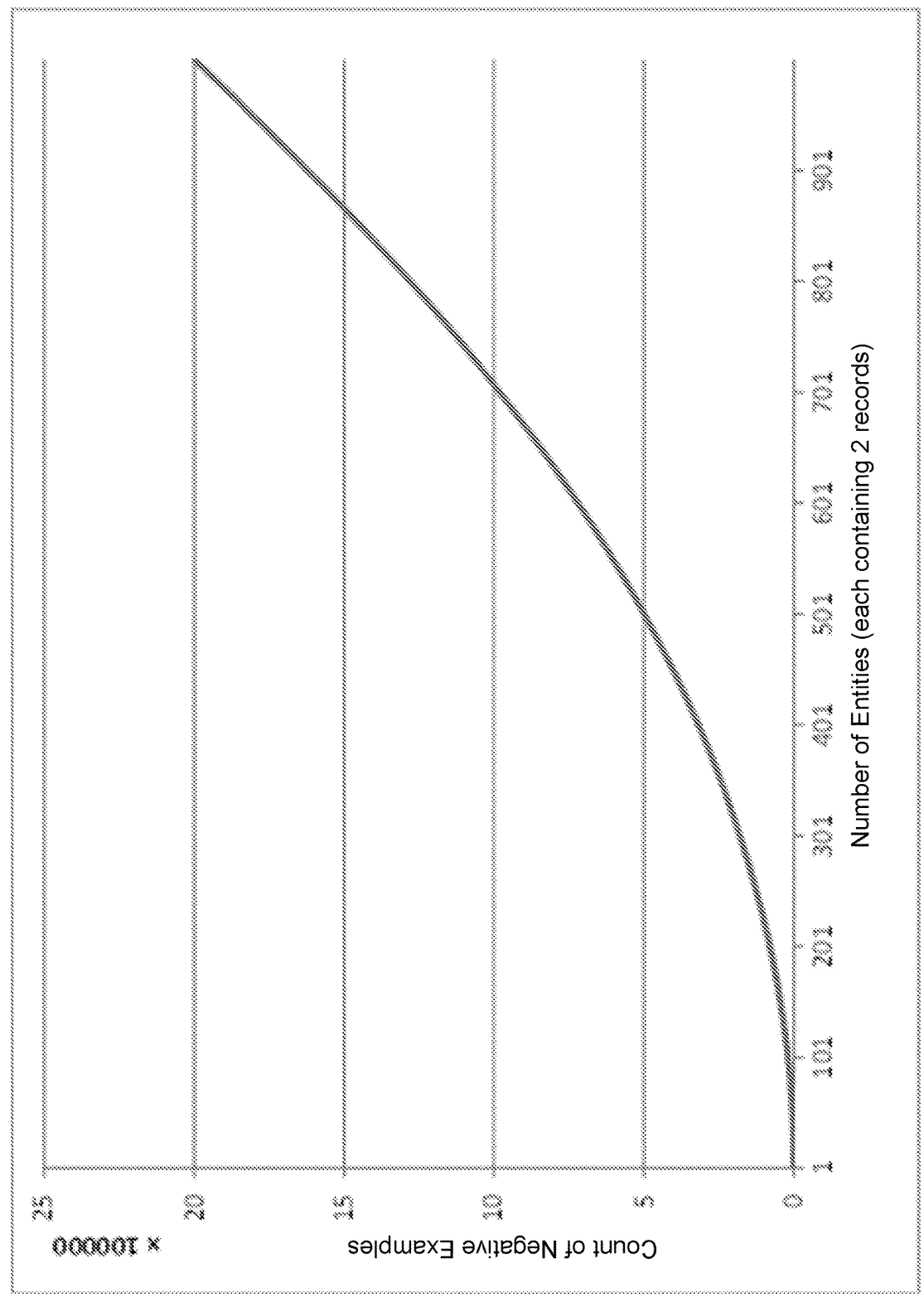
FIG. 8 shows the relationship of negative examples with the number of entities.

FIG. 8 illustrates a chart showing the exponential growth of negative examples with entities containing 2 records. In FIG. 8, the exponential increase in the number of negative training instances presents both computational and training set balance challenges. Due to time constraints and limited computation resources, it is often desirable to limit the size of the training data set that the machine learning algorithm can crunch; hence, decisions should be made with regards to the selection of the training data.

Furthermore, unbalanced training sets (i.e. significantly more of one label than the other(s)) have been well documented to have a degrading effect on the performance of machine learning algorithms. Methods such as assigning different weights to classes from different labels, artificially increasing the number of under-represented labels, and decreasing the number of over-represented labels for mitigating this challenge, have been introduced for mitigating this challenge.

The selection of negative training instances (i.e., linkage data instance having "not same entity" label) can be approached using random sampling (any two records belonging to different entities), however the selected samples are not likely to cover the most challenging training samples given the nature of entity resolution. For instance, given a person within a population, a majority of the other people in the population will likely not share the same/similar characteristics, e.g., name, date of birth (DOB), city, zip and, alma mater, etc. And theoretically, the overwhelming number of negative samples picked for this person will come from among such people. Hence, the use of such training samples can be expected to perform poorly when tested on the entire population when the test samples come across other people who, for instance, share the same zip code.

i. Linearly Independent Link Features

The method of selection of the training instance described below is autonomous, and depends only on the given entity data, and similarity metrics. The method approaches this challenge by supposing that the columns in the training instances (i.e., each value in the link feature set) are linearly independent. This supposition reduces the count of value unique combinations that must be considered. This reduction in value unique value combinations can be illustrated by considering a set of data with two columns each containing values between 0 and 9. The possible count of unique row combinations is 100; which is the number of unique values in each column. By supposing that the columns of the same dataset are linearly independent, the possible count of unique rows is 10; which is the number of unique values in a column. The assumption of linear independence while it has limitations, has proven efficient in several statistical analyses and is the basis of many statistical theory.

By considering each link feature as linearly independent, the pairs of values belonging to both positive and negative labels can be easily identified (based on the associated entity) and is relatively less than the count of unique rows across multiple fields.

ii. Entropy-Based Link Feature Sample Selection

Figure 9:
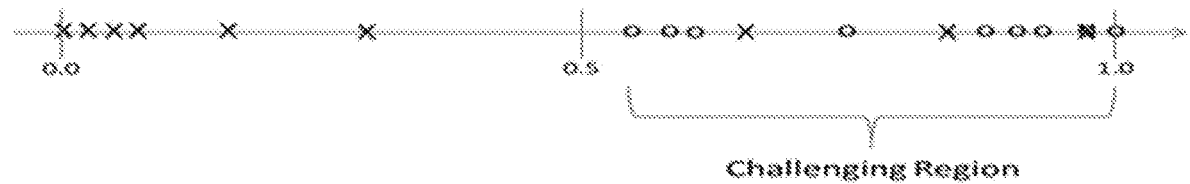
FIG. 9 shows an exemplary challenging classification region.

Within the values contained in each column of a training set, the most challenging training instances are those with values from both labels falling within the same range(s), i.e., classes/labels are not well separated. Suppose that the similarity metric associated to the column generates similarity scores within the range 0 and 1, values between 0 and 0.5 all belong to the class "x" while values above 0.5 belong to both classes "x" and "o". The region(s) where class labels are not easily separable is/are referred to as the challenging region(s). FIG. 9 shows an example of a challenging classification region.

This sampling method choose the training instances that fall within the challenging region by identifying the sources (associated entity) of each unique value for a link feature. Pairs of value are selected from this unique; using the link feature value and the sources (records) of each element of the value pair, a level of ambiguity of the value pair may be observable i.e. the number of instances where they originate from the same entity vs. different entities. For example, the dataset may contain an entity having first names David and Dave (positive label), given that either name may also be contained in another entity (negative label), these value pairs are ambiguous, hence make for interesting samples. On the other hand, a personal unique identifier such as Social Security Number or Passport number, which are not likely to be found across entities, do not represent challenging scenarios to be captured in the training instances.

Another level of ambiguity used by the described method is obtained by measuring the similarity of the selected value pairs using the similarity metric associated with the link feature. The resulting link feature value provides a comprehensive view of value pairs ambiguity. All value pairs resulting in the same link feature value are considered to have the same level of ambiguity which is determined by analyzing the number of instances where the elements of each pair originate from the same entity vs. different entities. The implementation can be optimized by first selecting all unique value pairs for the positive labels thereby taking advantage of the relatively smaller number of possible training data instances, then considering only negative labels sharing record field value(s) with this positives instances are considered. This approach significantly reduces the number of link feature values to be computed in order to arrive at the challenging region for the targeted link feature.

The most ambiguous feature values are associated with an equal number of positive and negative links. Using this property, feature values in the challenging region(s) can be identified and their corresponding training samples selected.

The level of impurity (ambiguity) of the value pair can be measured using entropy. Entropy is calculated by summing of the product of the probability of each class within a set:

$$\text{Entropy} = \Sigma_i - p_i \log(p_i)$$

For example, if a value pair belongs to 14 positives and 16 negatives link labels, the value pair's entropy is calculated as $-(p1*\log(p1))-(p2*\log(p2))=0.99$ where $p1=14/30$ and $p2=16/30$. The proportion entropies of each link feature value are used to determine of the number of samples to be drawn contributed by each linkage feature value and value pair.

For example, looking at value pair ambiguity within all pairs with the same linkage feature value; if the total number of the positive and negative link labels associated with all the ambiguous value pairs in one field are 14 and 16, respectively, while the total number of the positive and negative link labels are 15 and 15 in another (entropy=1.0), the link feature with the higher entropy can be chosen to contribute more samples to the final training samples.

Finally, stratified sampling can be used to select training instances from the given dataset. First the contribution of each link feature is determined by its relative entropy; and secondly the contribution of each value pair is also determined by its relative entropy (within the link feature).

This multi-layered selection approach enables an algorithmically efficient and computationally inexpensive selection of the most difficult training samples. While this entropy sampling method was developed to help with the selection of negative training instances, it is equally applicable when it is required that only part (most challenging) of the available positive examples is selected.

iii. Comparison of Entropy-Based and Random Training Instances Sampling

Based on the above description, an optimal training set is one in which the positive and negative training instances have the maximum possible overlap. A method of measuring the overlap is the distribution of the minimum Euclidean distance of each negative training instance relative to all the positive training instances. Since smaller Euclidean distances indicate a higher level of overlap between the positive and negative training instances, a frequency distribution of the minimum Euclidean distances provides a good visualization of the entropy contained in the training data set.

Figure 10:
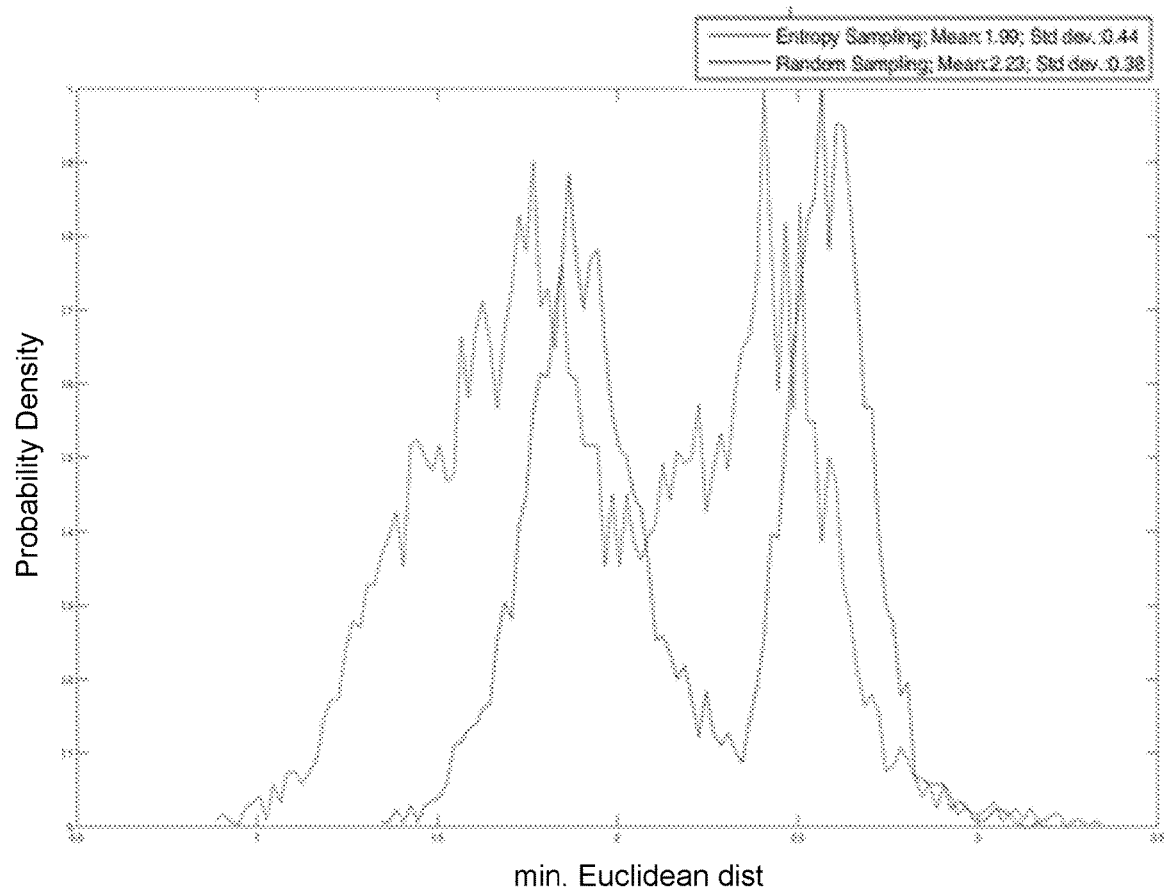
FIG. 10 shows a graph of entropy versus random sampling in the selection of training dataset.

FIG. 10 shows entropy vs. random sampling minimum Euclidean distance distribution. Specifically, the chart in FIG. 10 depicts the minimum Euclidean distance frequency distributions of 10,000 training samples drawn from 5,000 entities each having between 1 and 5 records. As can be observed, the distribution for entropy sampling is shifted more to the left (closer to zero minimum Euclidean distance) compared to that of the random sampling. The non-overlapping area of the distribution to the left represents the number of challenging training instances that the entropy sampling is covered but were not covered by random sampling.

Efficient Link Features Identification

Considering the link features as the dimension of similarity characteristics between two records, dimensionality reduction implies reducing the number of characteristics that sufficiently capture the similarity characteristics. In other words, one goal is to perform the minimum amount of comparisons that indicate the similarity between two records and or analyze the minimum amount of data when determining if records belong to the same entity.

The identification of the most efficient set of link features is achieved using statistical methods for dimensionality reduction. The array of link feature values and/or the generated linkage model are used to identify link attributes that do not offer significant amounts of information for separating the examples provided in the training data. For example, if the value of eye color in the entire dataset is brown, then the link attribute value (similarity score) for this field will be identical in all the training instances, hence it does not help in differentiating between the examples where records belong to the same entity and where they do not.

Methods like PCA where observations with possible correlated variables are transformed to linearly uncorrelated variables can be used to choose variables that provide the most differentiating information (variance). Also, machine learning algorithms, like decision trees, will generate a classifier that does not utilize linkage features that produce little or insignificant value.

This procedure identifies an optimal set of comparisons for generating link features.

Entity Resolution Usage

In order to use the classifier model generated using the above steps, link feature values are generated by the linkage features identified by the linkage model/dimension reduction step. This linkage data instance is then classified using the generated linkage model.

Some of the exemplary advantages associated with the disclosed technology include:

Use of records referring to the same entity to generate entity resolution classification labels for records that should be grouped together.

Use of records referring to the same entity to generate linkage data instances of records that should be grouped together.

Use of records referring to the different entities to generate entity resolution classification labels for records that should not be grouped together.

Use of records referring to different entities to generate linkage data instances of records that should not be grouped together.

Use of descriptions of errors/variations in records referring to the same entity to determine the best similarity/dissimilarity metrics to be used for generating entity resolution link features.

Figure 11:
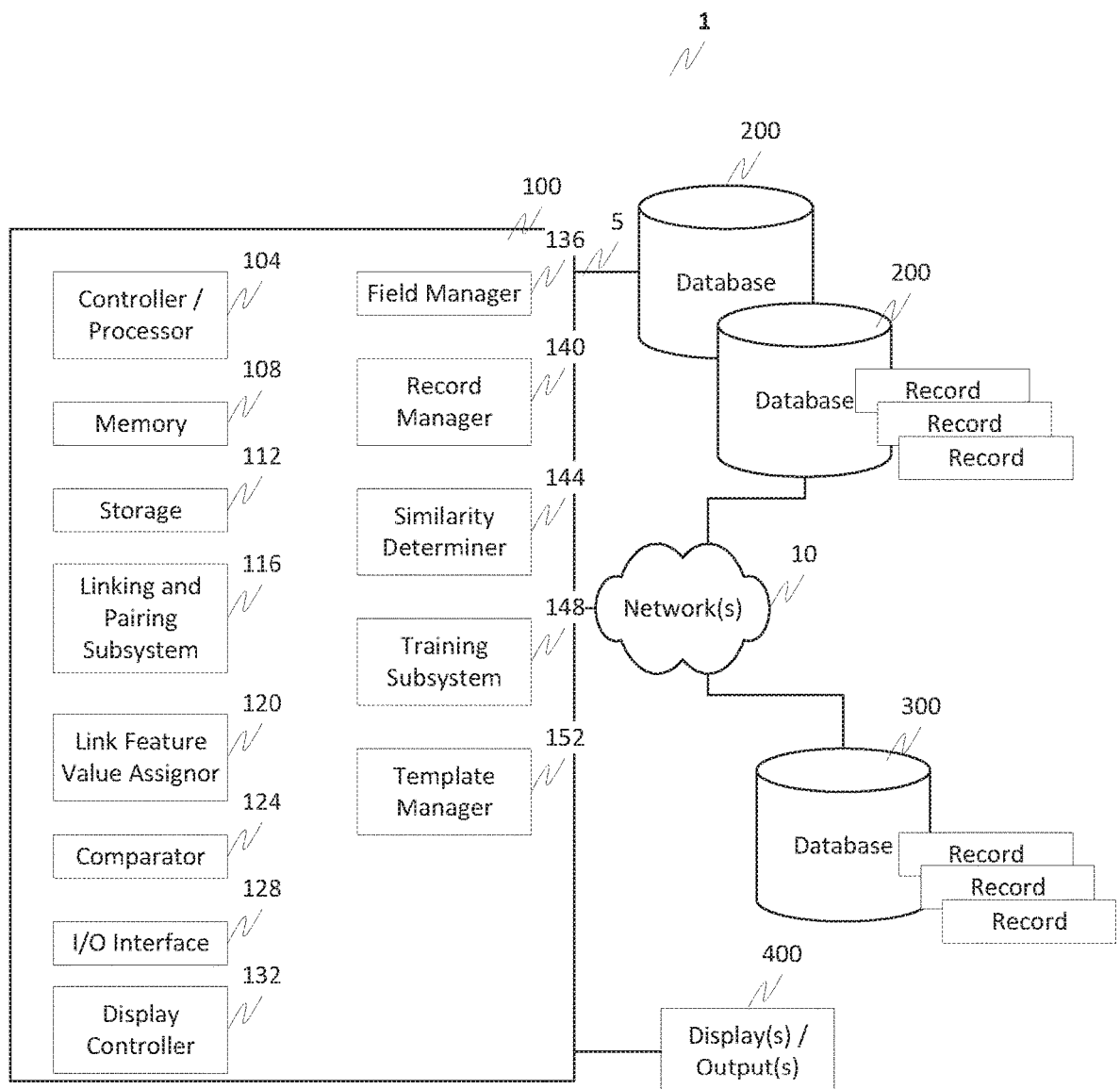
FIG. 11 is a block diagram of an exemplary entity resolution system and related components.

FIG. 11 illustrates an exemplary entity resolution system 1. The system 1 includes an entity resolution device 100 connectable to one or more databases 200 (including one or more records) and one or more training databases 300, including one or more training records. The entity resolution device 100 is connectable to the one or more databases 200-300 via one or more networks 10 and links 5. The entity resolution device 100 is also connectable to one or more displays/output device(s) 400.

The entity resolution device 100 includes (in addition to well-known componentry) a controller/processor 104, memory 108, storage 112, linking and pairing subsystem 116, link feature value assignor 120, comparator 124, I/O interface 128, display controller 132, field manager 136, record manager 140, similarity determiner 144, training subsystem 148 and template manager 152.

In operation, and in conjunction with any one or more of the techniques discussed herein, the entity resolution device 100 can be used to train for whether records belong to a same entity, or multiple, different entities. A plurality of records are received by the entity resolution device 100 from the database 300 in cooperation with the controller 104, memory 108, I/O interface 128, and storage 112—the records known to be associated with a same individual. As shown in FIG. 11, each of the records contain a plurality of data fields.

The linking and pairing subsystem 116 takes the received records and defines at least one link feature by pairing a field in one of the records with a field in another one of the records. The paired fields are then associated with a similarity metric. This similarity metric can be used by the similarity determiner 144 to compute a degree of similarity between the data in the paired fields.

The link feature value assignor 120 then applies the similarity metric of the at least one link feature to the data in the paired fields to produce a link feature value for each link feature which is stored in storage 112.

A plurality of defined link features are then compiled by the link feature value assignor 120 to produce a linkage data instance, this linkage data instance is stored and usable to determine whether records of unknown association belong to the same entity.

The similarity determiner 144 can then be used (in conjunction with memory 108 and controller 104) with the link feature set to determine if two records of unknown association are associated with the same entity, e.g., individual.

The template determiner can optionally save the link feature set as a template usable for determining whether records of unknown association belong to the same entity.

The similarity determiner 144 is further equipped to evaluate phonetic similarity between data fields for a given link feature. Optionally further, the similarity determiner can evaluate one or more of syntactic, numeric and color, etc., similarity between data in the fields of a given link feature. In general, any one or more known techniques/methodologies can be used to measure similarity. As another example, strings where phonetic and syntactic similarity metrics could be used. However, it is also possible to measure similarity related to distance (proximity), shape, semantic meaning, etc., as one skilled in the art would appreciate.

The field manager 136, optionally in cooperation with the comparator 124 and training subsystem 148, can generate a linkage data instance comprised of multiple defined link features that are used to determine whether records of unknown association belong to a same individual and applying the link features to two records of unknown association to produce a linkage data instance used to determine whether the two records are associated with a same individual (which can be stored and managed by the template manager 152).

The record manager 140 can be used to receive inputs such as types of errors and variations that may appear in records that are associated with the same individual. This information can then be used as feedback to optionally improve the linkage model accuracy and coverage.

FIG. 12 illustrates an exemplary record 504. The record 504 includes one or more fields including one or more of name (e.g., Last, First Middle), Date of Birth, Address information, biometric information, (e.g., fingerprint information, facial image, other data/images, and in general any biometric information). The record can further include any information about an individual or entity.

The various developed templates can then be used in any entity resolution system as discussed to improve the functionality as discussed above.

In accordance with another exemplary embodiment, the techniques discussed herein can be provided in a software development kit that performs fuzzy text-based filtering, searching, matching, and linking functions towards discovery of useful information in identity data.

Analysis of text-based identity data is naturally complementary to biometric verification and identification, and the techniques discussed herein can be optimized for processing and analysis of data that includes biometrics.

The exemplary techniques provide many advanced text matching comparison algorithms and flexibility in how matching algorithms behave (e.g. thresholds, data definitions) and can be used to perform advanced analysis of text-based identity data for several useful investigative applications including data analysis and quality assurance, data integration, identity resolution, and link analysis.

In accordance with one exemplary operation embodiment, the system can perform comparisons between text fields in identity records, such as names, addresses, and other biographic identity data. It can be configured to recognize common variations in spellings and formats to improve the performance and reliability of identity search and filter processes as shown in Table 1 below.

TABLE 1

| NAME VARIANTS | SPECIAL CHARACTERS | TYPOS |
|---|---|---|
| | | Washington = Washimgton |
| Brian = Bryan | Mueller = Müller | MISSPELLINGS |
| Sara = Sarah | OCallahan = O'Callahan | Albuquerque = Albequrque |
| NICKNAMES | PHONETIC SIMILARITIES | NAME CHANGES |
| Jack = John | | Laura Smith = |
| Bobby = Robert | Mohamed = Muhammad | Laura Smith-Jones |
| | Geoffrey = Jeffrey | |

Figure 13:
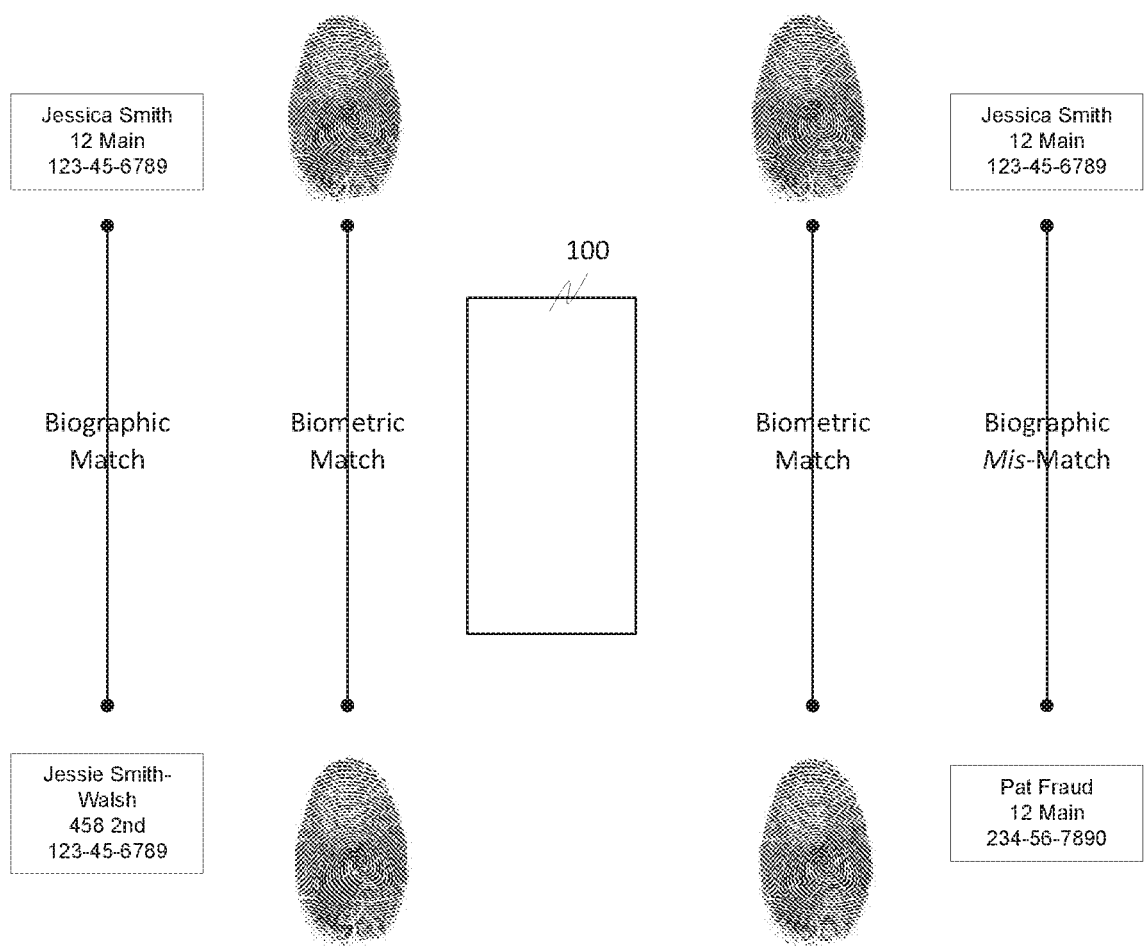
FIG. 13 illustrates how the system can be used to identify potentially fraudulent identity information in a biometric database based on the content of multiple fields and attributes.

As shown in FIG. 13, the system can also be used to identify potentially fraudulent identity information in a biometric database based on the content of multiple fields and attributes. For example, a name that changes due to marriage or an address that changes due to a move can be noted as a biographic match, while an identity demonstrating potentially fraudulent content can be automatically highlighted as requiring further investigation.

The system can further be utilized in biometric search filtering for pre-filter or post-filtering a biometric search based on fuzzy matching of text-based fields, including biographic information or "soft biometrics" such as hair color, eye color, height, weight, and age.

The system can further be utilized for identity data analysis and quality assurance. Ensuring the quality and integrity of identity data is vital to its effective use, and so can be performed as an integral part of an identity system. The systems and techniques disclosed herein can be used to assess the quality and integrity of identity data, including data that contains biometrics. It can be used to detect errors such as typos, misspellings, as well as biometric false matches, non-matches, and crosslinks as discussed above.

Figure 14:
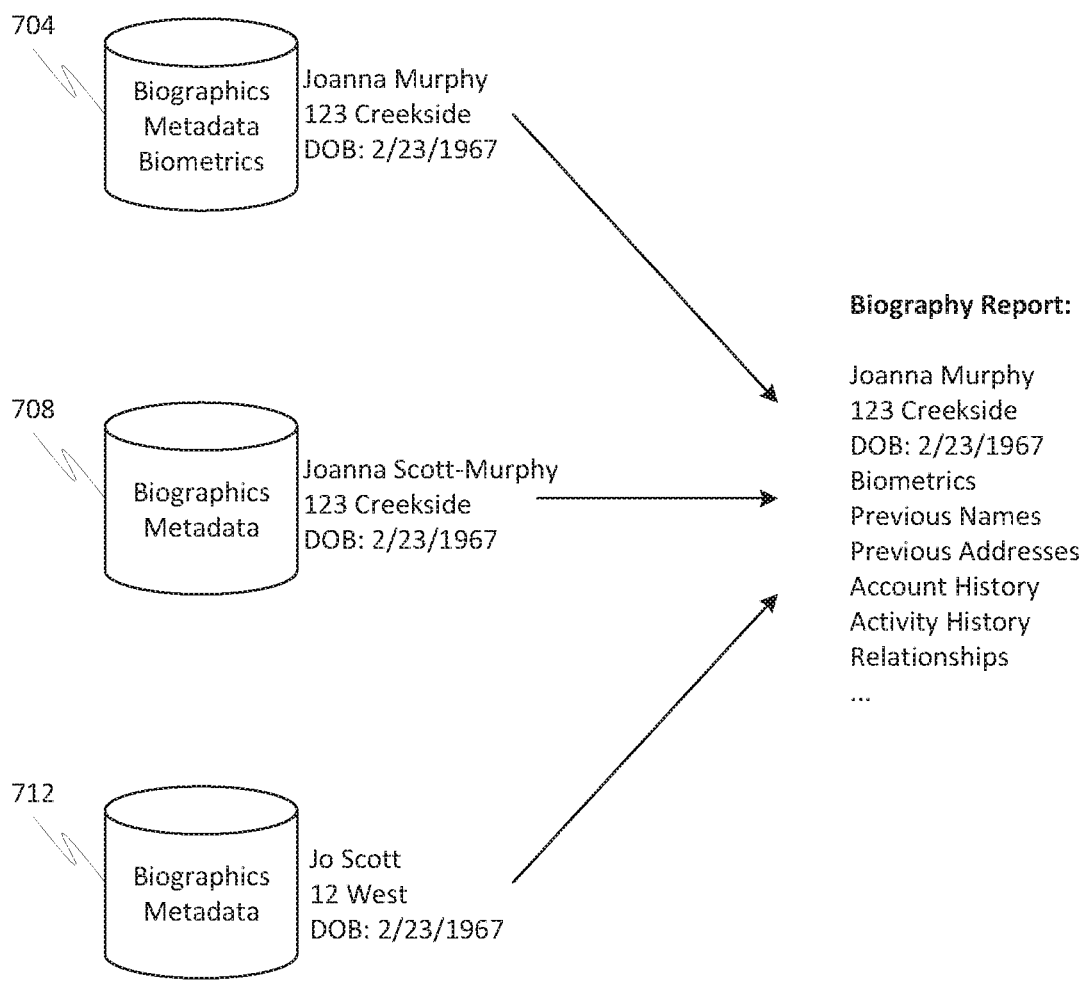
FIG. 14 illustrates how the system can perform integration of identity data records across databases.
Figure 15:
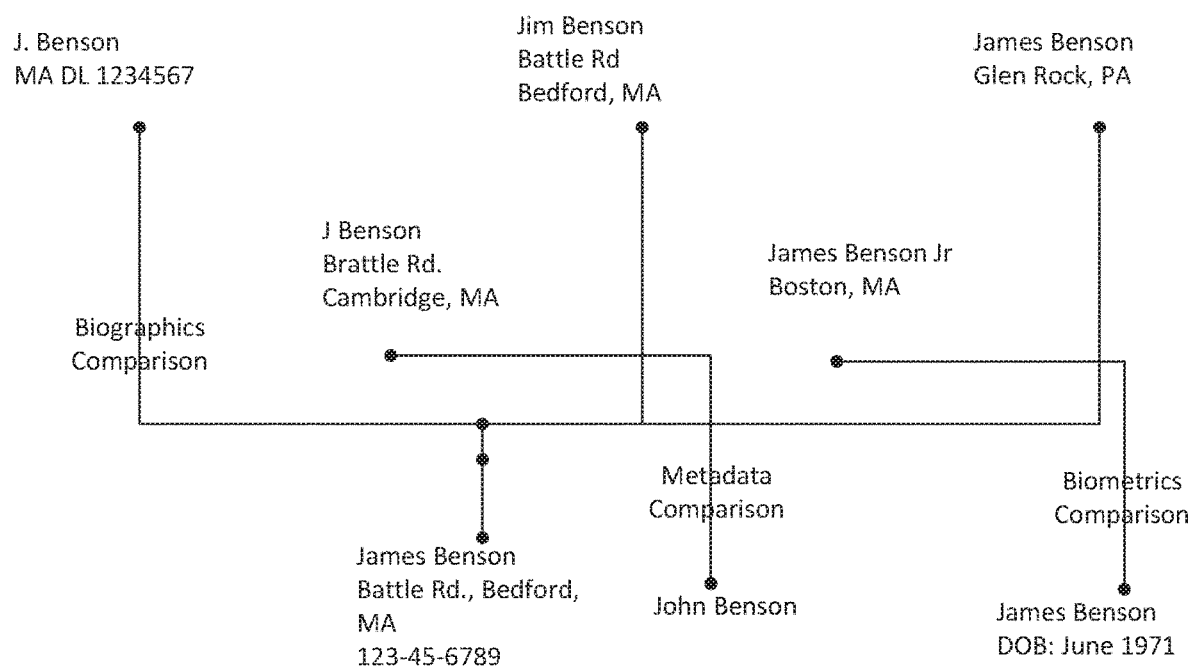
FIG. 15 shows an exemplary multidimensional view of an individual's biographic information and activities.

The system can still further be utilized for data integration and identity resolution (See FIGS. 14-15). Here, the system can perform integration of identity data records across databases, (See FIG. 14 and databases 704-712) linking attributes and encounters associated with a particular individual to a single identity record. The system 100 can use fuzzy text comparison algorithms to link and merge data records, and accommodate artifacts such as misspellings, name variations, and address changes as discussed. Once the data sources are resolved, a user can perform queries and generate a comprehensive multidimensional view (See FIG. 15 representation) of an individual's biographic information and activities.

Figure 16:
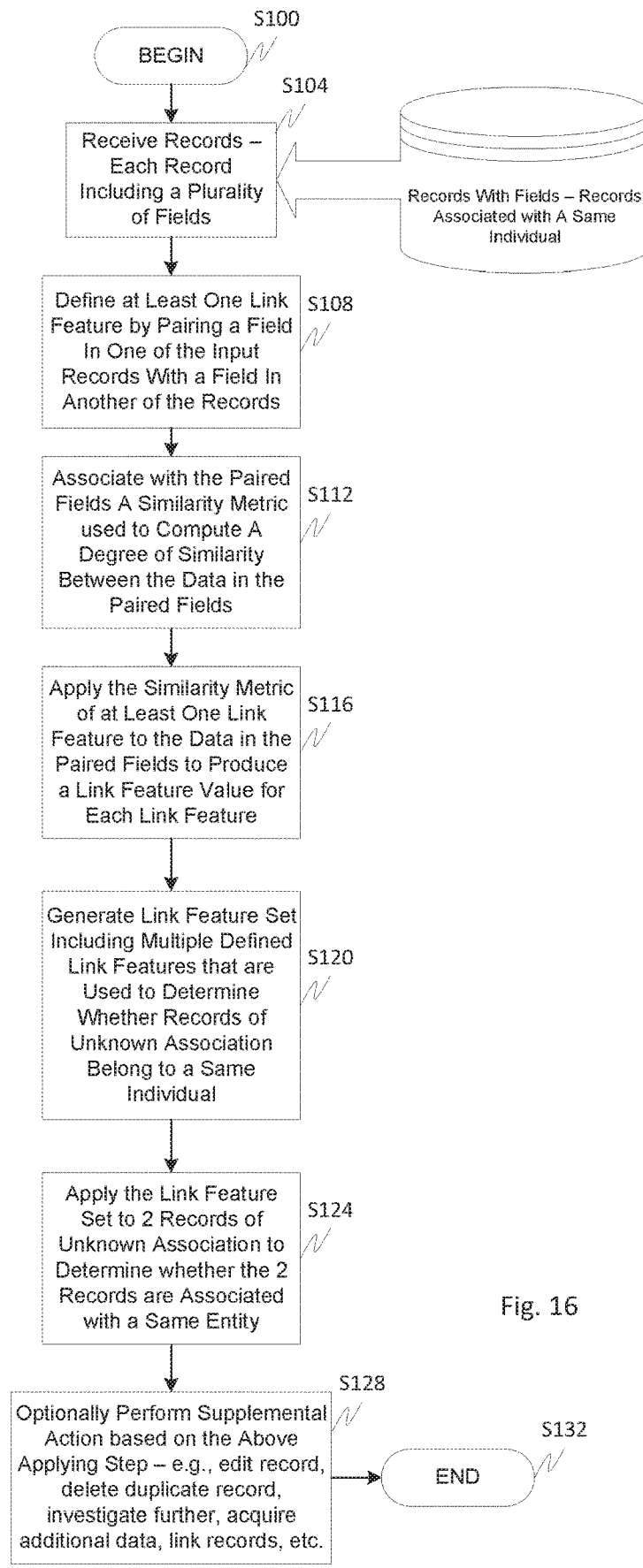
FIG. 16 is a flowchart illustrating an exemplary method for entity resolution.

FIG. 16 illustrates in greater detail an exemplary process for training a computing system to detect whether records belong to a same entity or a different entity. The exemplary method begins in step S100 and continues to step S104. In step S104, as input, a plurality of records are received that are known to be associated with a same individual. Each record includes a plurality of fields containing data. Next, in step S108, at least one link feature is defined by pairing a field in one of the records with a field in another of the records and in step S112, the paired fields associated with a similarity metric used to compute a degree of similarity between the data in those paired fields. Next, in step S116, the similarity metric of the at least one link feature is applied to the data in the paired fields to produce a link feature value for each link feature. Control then continues to step S120.

In step S120, a linkage data instance comprised of multiple defined link features and link feature values that are used to determine whether records of unknown association belong to a same individual is generated. Next, in step S124, the link feature set is applied to two records of unknown association to determine whether these two records are associated with a same individual. Then, in step S128, a supplemental action is optionally performed based on the above applying step—e.g., edit record, delete duplicate record, investigate further, acquire additional data, link records, etc. Control then continues to step S132 where the control sequence ends.

Exemplary aspects are directed toward:

A method of training a system to detect whether records belong to a same entity or a different entity, the method comprising:

receiving, as input, a plurality of records known to be associated with a same entity, each record including a plurality of fields containing data about the entity;

defining at least one link feature by pairing a field in one of the records with a field in another of the records;

associating with the paired fields a similarity metric used to determine a degree of similarity between the data in those paired fields;

applying the similarity metric of the at least one link feature to the data in the paired fields to produce a link feature value for each link feature;

generating a link feature set comprised of multiple defined link features that are used to determine whether records of unknown association belong to a same individual;

applying the link feature set to two records of unknown association to determine whether the two records are associated with a same individual; and outputting an indication as to whether the two records of unknown association are associated with the same individual.

Any of the above aspects, further comprising reducing a number of link features in the link feature set.

Any of the above aspects, further comprising saving the link feature set as a template for determining whether records of unknown association belong to a same entity.

Any of the above aspects, further comprising receiving, as input, a plurality of records known to be associated with different entities, each record including a plurality of fields containing data, wherein the link feature set includes one or more defined link features that are used to determine whether records of unknown association belong to different entities.

Any of the above aspects, wherein the similarity metric of a given link feature evaluates phonetic similarity between the data in the fields of that given link feature.

Any of the above aspects, wherein the similarity metric of a given link feature evaluates a syntactic, numerical, color, etc., similarity between the data in the fields of that given link feature.

Any of the above aspects, further comprising determining whether the two records of unknown association are associated with the same entity based on whether the application of the link feature set to the two records of unknown association produces one or more feature link values which can be classified by a linkage model.

Any of the above aspects, further comprising:

providing a description of certain types of errors and variations that may appear in records that are associated with the same individual; and applying the description to determine the similarity metric used to generate one or more of the at least one link feature.

A non-transitory computer readable information storage media having stored thereon instructions that when executed by one or more computers cause the one or more computers to perform a method comprising:

receiving, as input, a plurality of records known to be associated with a same entity, each record including a plurality of fields containing data about the entity;

defining at least one link feature by pairing a field in one of the records with a field in another of the records;

associating with the paired fields a similarity metric used to determine a degree of similarity between the data in those paired fields;

applying the similarity metric of the at least one link feature to the data in the paired fields to produce a link feature value for each link feature;

generating a link feature set comprised of multiple defined link features that are used to determine whether records of unknown association belong to a same individual;

applying the link feature set to two records of unknown association to determine whether the two records are associated with a same individual; and outputting an indication as to whether the two records of unknown association are associated with the same individual.

Any of the above aspects, further comprising reducing a number of link features in the link feature set.

Any of the above aspects, further comprising saving the link feature set as a template used to determine whether records of unknown association belong to a same individual.

Any of the above aspects, further comprising receiving, as input, a plurality of records known to be associated with different entities, each record including a plurality of fields containing data, wherein the link feature set includes one or more defined link features that are used to determine whether records of unknown association belong to different entities.

Any of the above aspects, wherein the similarity metric of a given link feature evaluates phonetic similarity between the data in the fields of that given link feature.

Any of the above aspects, wherein the similarity metric of a given link feature evaluates a syntactic, numerical, color, etc., similarity between the data in the fields of that given link feature.

Any of the above aspects, further comprising computer readable program code that, if executed, determines whether the two records of unknown association are associated with the same entity based on whether the application of the link feature set to the two records of unknown association produces one or more feature link values that exceed a predefined threshold or satisfy a statistical evaluation.

Any of the above aspects, further comprising:

accessing a description of certain types of errors and variations that may appear in records that are associated with the same individual; and applying the description to determine the similarity metric used to generate one or more of the at least one link feature.

An entity resolution system comprising:

in I/O interface coupled to memory or storage that receives, as input, a plurality of records known to be associated with a same entity, each record including a plurality of fields containing data about the entity;

a linking and pairing subsystem that defines at least one link feature by pairing a field in one of the records with a field in another of the records and associates with the paired fields a similarity metric used to determine a degree of similarity between the data in those paired fields;

a link feature value assignor that applies the similarity metric of the at least one link feature to the data in the paired fields to produce a link feature value for each link feature;

a similarity determiner that generates a link feature value for one or multiple defined link features that are used to determine whether records of unknown association belong to a same individual and applies the linkage data instance of two records of unknown association to determine whether the two records are associated with a same individual; and an output device that outputs an indication as to whether the two records of unknown association are associated with the same individual.

Any of the above aspects, further comprising a dimension reducer that reduces a number of link features in the link feature set.

Any of the above aspects, wherein the link feature set is saved as a template for determining whether records of unknown association belong to a same entity.

Any of the above aspects, wherein the I/O interface further receives, as input, a plurality of records known to be associated with different entities, each record including a plurality of fields containing data, wherein the linkage data instance includes one or more defined link features that are used to determine whether records of unknown association belong to different entities.

Any of the above aspects, wherein the similarity metric of a given link feature evaluates phonetic similarity between the data in the fields of that given link feature.

Any of the above aspects, wherein the similarity metric of a given link feature evaluates a syntactic, numerical, color, etc., similarity between the data in the fields of that given link feature.

Any of the above aspects, wherein the similarity determiner further determines whether the two records of unknown association are associated with the same entity based on whether the application of the linkage data instance of the two records of unknown association produces one or more feature link values which can be classified by a linkage model.

Any of the above aspects, further comprising an output device that provides a description of certain types of errors and variations that may appear in records that are associated with the same individual and applies the description to determine the similarity metric used to generate one or more of the at least one link feature.

One or more means for performing any one or more of the above functions.

Any one or more of the features as substantially described herein.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein may show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, or collocated on a particular node/element(s) of a distributed network, such as a communications network. As will be appreciated from the description, and for reasons of computational efficiency, the components of the system can be arranged at any location within a distributed network without affecting the operation of the system.

Furthermore, it should be appreciated that the various links, including communications channel(s), connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts/operational flows have been discussed in relation to a particular exemplary sequence of events, it should be appreciated that changes to this sequence can occur without materially effecting the operation of the embodiment(s). Additionally, the exact sequence of events need not occur as set forth in the exemplary embodiments, but rather the steps can be performed by one or the other device(s) in the system. Additionally, the exemplary techniques illustrated herein are not limited to the specifically illustrated embodiments but can also be utilized with the other exemplary embodiments and each described feature is individually and separately claimable.

As will be appreciated by one skilled in the art, aspects of the present disclosure may be embodied as a system, method, and/or computer program product. Thus, aspects of the present disclosure may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

The computer readable medium may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any non-transitory, tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof. A computer readable storage medium can be any computer readable medium that is not a computer readable signal medium such as a propagated data signal with computer readable program code embodied therein.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, C#, Pascal, JAVA, JAVA Script, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer, workstation or mobile device platforms. Alternatively, the disclosed system may be implemented partially in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, mobile device, smartphone, a microprocessor, or the like. In these instances, the systems and methods of this invention can be implemented as program embedded on personal computer such as JAVA® or CGI script, as a resource residing on a server or graphics workstation, as a routine embedded in a dedicated fingerprint processing system, as a plug-in, or the like. The system can also be implemented by physically incorporating the system and method into a software and/or hardware system, such as the hardware and software systems of an image processor.

While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this disclosure.

The invention claimed is:

1. A method for a system to detect whether records belong to a same entity or a different entity, the method comprising:
in a training stage:
receiving, as input, a plurality of records known to be associated with a same entity, each record including a plurality of fields containing data about the same entity;
defining multiple link features by, for each link feature of the multiple link features, pairing a field in one of the records with a field in another of the records to obtain paired fields and associating with the paired fields a similarity metric used to determine an amount of similarity between the data in those paired field;
applying the similarity metric of the at least one link feature to the data in the paired fields to produce a link feature value for each link feature;
generating a linkage data instance comprised of the multiple defined link features that will be used, in a subsequent usage stage, to determine whether records of unknown association are associated with the same entity; and
in a usage stage:
applying the link features to two records of unknown association to produce a linkage data instance;
using the linkage data instance to determine whether the two records are associated with a same individual; and
outputting an indication as to whether the two records of unknown association are associated with the same individual.

2. The method of claim 1, further comprising reducing a number of link features in a link feature set.

3. The method of claim 1, further comprising saving the linkage data instance as a template for determining whether records of unknown association belong to a new same entity.

4. The method of claim 1, further comprising receiving, as input, a plurality of records known to be associated with different entities, each record including a plurality of fields containing data, wherein the linkage data instance includes one or more defined link features that are used to determine whether records of unknown association belong to different entities.

5. The method of claim 4, further comprising determining whether the two records of unknown association are associated with the same entity based on whether the application of the linkage data instance produced by applying the link features to the two records of unknown association produces one or more feature link values which can be classified by a linkage model.

6. The method of claim 1, wherein the similarity metric of a given link feature evaluates phonetic similarity between the data in the fields of that given link feature.

7. The method of claim 1, wherein the similarity metric of a given link feature evaluates one or more of a syntactic, numerical and color similarity between the data in the fields of that given link feature.

8. The method of claim 1, further comprising:
providing a description of certain types of errors and variations that may appear in records that are associated with the same individual; and
applying the description to determine the similarity metric used to generate one or more of the at least one link feature.

9. A non-transitory computer readable information storage media having stored thereon instructions that when executed by one or more computers cause the one or more computers to perform a method comprising:
in a training stage:
receiving, as input, a plurality of records known to be associated with a same entity, each record including a plurality of fields containing data about the same entity;
defining multiple link features by, for each link feature of the multiple link features, pairing a field in one of the records with a field in another of the records to obtain paired fields and associating with the paired fields a similarity metric used to determine an amount of similarity between the data in those paired fields;
applying the similarity metric of the at least one link feature to the data in the paired fields to produce a link feature value for each link feature; and
generating a linkage data instance comprised of the multiple defined link features that will be used, in a subsequent usage stage, to determine whether records of unknown association are associated with the same entity;
in a usage stage:
applying the link features to two records of unknown association to produce a linkage data instance;
using the linkage data instance to determine whether the two records are associated with a same individual; and
outputting an indication as to whether the two records of unknown association are associated with the same individual.

10. The non-transitory computer readable information storage media of claim 9, further comprising reducing a number of link features in a link feature set.

11. The non-transitory computer readable information storage media of claim 9, further comprising saving a link feature set as a template used to determine whether records of unknown association belong to a new same individual.

12. The non-transitory computer readable information storage media of claim 9, further comprising receiving, as input, a plurality of records known to be associated with different entities, each record including a plurality of fields containing data, wherein a link feature set includes one or more defined link features that are used to determine whether records of unknown association belong to different entities.

13. The non-transitory computer readable information storage media of claim 9, wherein the similarity metric of a given link feature evaluates phonetic similarity between the data in the fields of that given link feature.

14. The non-transitory computer readable information storage media of claim 9, wherein the similarity metric of a given link feature evaluates one or more of a syntactic, numerical and color similarity between the data in the fields of that given link feature.

15. The non-transitory computer readable information storage media of claim 9, further comprising computer readable program code that, if executed, determines whether the two records of unknown association are associated with the same entity based on whether the application of a link feature set to the two records of unknown association produces one or more feature link values that exceed a predefined threshold or satisfy a statistical evaluation.

16. The non-transitory computer readable information storage media of claim 9, further comprising:
  accessing a description of certain types of errors and variations that may appear in records that are associated with the same individual; and
  applying the description to determine the similarity metric used to generate one or more of the at least one link feature.

17. An entity resolution system comprising:
  in I/O interface coupled to memory or storage that receives, as input, a plurality of records known to be associated with a same individual, each record including a plurality of fields containing data about the individual;
  a linking and pairing subsystem that defines multiple link features by, for each link feature of the multiple link features, pairing a field in one of the records with a field in another of the records to obtain paired fields and associating with the paired fields a similarity metric used to determine an amount of similarity between the data in those paired fields;
  a link feature value assignor that applies the similarity metric of the at least one link feature to the data in the paired fields to produce a link feature value for each link feature;
  a similarity determiner that generates a linkage data instance comprised of the multiple defined link features that will be used, in a subsequent usage stage, to determine whether records of unknown association are associated with the same individual wherein in the usage stage the link features are applied to two records of unknown association to produce a linkage data instance and the linkage data instance is used to determine whether the two records are associated with a same individual; and
  an output device that outputs an indication as to whether the two records of unknown association are associated with the same individual.

18. The entity resolution system of claim 17, further comprising a dimension reducer that reduces a number of link features in the link feature set.

19. The entity resolution system of claim 17, wherein the link feature set is saved as a template for determining whether records of unknown association belong to a new same individual.

20. The entity resolution system of claim 17, wherein the I/O interface further receives, as input, a plurality of records known to be associated with different individuals, each record including a plurality of fields containing data, wherein the link feature set includes one or more defined link features that are used to determine whether records of unknown association belong to different individuals.

21. The entity resolution system of claim 20, wherein the similarity determiner further determines whether the two records of unknown association are associated with the same individual based on whether the application of the link feature set to the two records of unknown association produces one or more feature link values which can be classified by a linkage model.

22. The entity resolution system of claim 17, wherein the similarity metric of a given link feature evaluates phonetic similarity between the data in the fields of that given link feature.

23. The entity resolution system of claim 17, wherein the similarity metric of a given link feature evaluates one or more of a syntactic, numerical and color similarity between the data in the fields of that given link feature.

24. The entity resolution system of claim 17, further comprising an output device that provides a description of certain types of errors and variations that may appear in records that are associated with the same individual and applies the description to determine the similarity metric used to generate one or more of the at least one link feature.

* * * * *